(12) United States Patent
Tsuchida et al.

(10) Patent No.: US 12,098,998 B2
(45) Date of Patent: Sep. 24, 2024

(54) SEAL MATERIAL FOR ANALYZER, AND FLOW CELL, DETECTOR, AND ANALYZER USING THE SAME

(71) Applicants: Tomoegawa Co., Ltd., Tokyo (JP); SHIMADZU CORPORATION, Kyoto (JP)

(72) Inventors: Minoru Tsuchida, Shizuoka (JP); Akiyasu Oyaizu, Shizuoka (JP); Yusuke Nagai, Kyoto (JP); Katsuya Okumura, Tokyo (JP)

(73) Assignees: Tomoegawa Co., Ltd., Tokyo (JP); SHIMADZU CORPORATION, Kyoto (JP)

( * ) Notice: Subject to any disclaimer, the term of this patent is extended or adjusted under 35 U.S.C. 154(b) by 682 days.

(21) Appl. No.: 17/280,414

(22) PCT Filed: Aug. 13, 2019

(86) PCT No.: PCT/JP2019/031800
§ 371 (c)(1),
(2) Date: Mar. 26, 2021

(87) PCT Pub. No.: WO2020/066347
PCT Pub. Date: Apr. 2, 2020

(65) Prior Publication Data
US 2022/0026345 A1    Jan. 27, 2022

(30) Foreign Application Priority Data

Sep. 28, 2018    (JP) .................................. 2018-184552

(51) Int. Cl.
*D01F 6/60*    (2006.01)
*A41G 3/00*    (2006.01)
(Continued)

(52) U.S. Cl.
CPC .............. *G01N 21/09* (2013.01); *B29C 39/10* (2013.01); *B29C 70/42* (2013.01);
(Continued)

(58) Field of Classification Search
None
See application file for complete search history.

(56) References Cited

U.S. PATENT DOCUMENTS

2007/0005295 A1    3/2007    Blair
2007/0052956 A1    3/2007    Blair
(Continued)

FOREIGN PATENT DOCUMENTS

EP    427313 A3    5/1991
JP    S47-30935    12/1972
(Continued)

OTHER PUBLICATIONS

Machine translation of JP2009024877 (Year: 2009).*
(Continued)

*Primary Examiner* — Shawn Mckinnon
(74) *Attorney, Agent, or Firm* — Muncy, Geissler, Olds & Lowe, P.C.

(57) ABSTRACT

Provided is a seal material having high rigidity without deformation or breakage, excellent corrosion resistance to fluid, and low solubility when used under high sealing force, and to provide a flow cell, a detector, and an analyzer in which there is no fluid leakage, contamination of the seal material components is prevented, and the replacement frequency is low. Provided are a seal material for an analyzer, including a resin and at least one layer of fiber sheet embedded in the resin, wherein the at least one layer of fiber sheet is embedded between and in substantially parallel to two seal surfaces: a first seal surface, which is one resin surface of the seal material; and a second seal surface, which
(Continued)

is the other resin surface substantially parallel to the former one, and a flow cell, a detector, and an analyzer using the seal material.

15 Claims, 2 Drawing Sheets

(51) Int. Cl.
    *B29C 39/10*     (2006.01)
    *B29C 70/42*     (2006.01)
    *C08K 3/34*     (2006.01)
    *D01F 1/10*     (2006.01)
    *D01F 8/12*     (2006.01)
    *D01F 8/16*     (2006.01)
    *G01N 21/03*     (2006.01)
    *G01N 21/09*     (2006.01)
    *G01N 30/74*     (2006.01)
    *B29K 27/18*     (2006.01)
    *B29K 105/08*     (2006.01)
    *F16J 15/08*     (2006.01)
    *G01N 30/02*     (2006.01)

(52) U.S. Cl.
    CPC ......... *G01N 21/0317* (2013.01); *G01N 30/74* (2013.01); *B29K 2027/18* (2013.01); *B29K 2105/0854* (2013.01); *F16J 15/0806* (2013.01); *G01N 2030/027* (2013.01)

(56) References Cited

U.S. PATENT DOCUMENTS

2016/0010273 A1* 1/2016 Ashayer-Soltani .......................... D06M 15/285
    428/221
2016/0282317 A1    9/2016 Gunji

FOREIGN PATENT DOCUMENTS

| | | | |
|---|---|---|---|
| JP | 48-101472 | A | 12/1973 |
| JP | 62-181383 | A | 8/1987 |
| JP | H01-58638 | U | 4/1989 |
| JP | H02-470 | U | 1/1990 |
| JP | 3-193423 | A | 8/1991 |
| JP | H03200888 | * | 9/1991 |
| JP | 2005-337401 | A | 12/2005 |
| JP | 2005337401 | * | 12/2005 |
| JP | 2006-505779 | A | 2/2006 |
| JP | 2006-58147 | A | 3/2006 |
| JP | 2006-71015 | A | 3/2006 |
| JP | 2009-24877 | A | 2/2009 |
| JP | 2014-55784 | A | 3/2014 |
| JP | 2016-180728 | A | 10/2016 |

OTHER PUBLICATIONS

Machine Translation of JPH03200888 (Year: 1991).*
Machine Translation of JP2014055784 (Year: 2014).*
Machine Translation of JP2005337401 (Year: 2005).*
International Preliminary Report on Patentablity for PCT/JP2019/031800 Issued on Mar. 23, 2021 that contains English translation of Written opinion of the International Searching Authority for PCT/JP2019/031800 mailed Nov. 19, 2019.
Office Action of the corresponding CN application No. 201980062522.5 mailed Jul. 13, 2023 and English translation thereof.
Introduction to Materials, Editor-in-Chief Shi Huisheng, 2nd Edition, Shanghai; Tongji University Press, published Aug. 31, 2009 and Partial English translation thereof.

* cited by examiner

SEAL MATERIAL FOR ANALYZER, AND FLOW CELL, DETECTOR, AND ANALYZER USING THE SAME

TECHNICAL FIELD

The present invention relates to a seal material for an analyzer, and a flow cell, a detector, and an analyzer using the seal material.

BACKGROUND ART

Seal materials such as gaskets and packings are used for preventing fluid leakage at a connection part of instrument and/or piping, and various materials such as metal, rubber, and resin are available. At the connection part where high pressure is applied, it is necessary to seal with a stronger force. Thus, if a material has low rigidity, the resulting seal material is deformed or damaged in a short period, thereby causing leakage. In addition, since such a seal material should be frequently replaced (due to low durability), the instrument/device downtime becomes long. Because of this, a metal seal material or a thick resin seal material with high rigidity is used. However, in the case of use for a connection part in, for instance, a small precision instrument, thickening of the seal material has a limitation. Accordingly, a thin, small, and highly rigid (highly durable) seal material has been sought.

Further, if fluid flowing through piping or the like causes corrosion or dissolution of metal, resin or the like, the material that can be used is limited to a material having high chemical resistance, etc. In particular, when the seal material is used in a high-precision analyzer or the like, the problem is that components or the like of the seal material are mixed in fluid flowing through piping or the like. Thus, accurate analysis cannot be performed.

Specific examples include flow cells used in analyzers such as liquid chromatographs and supercritical fluid chromatographs. The liquid chromatographs or supercritical fluid chromatographs are each an instrument for quantitatively/qualitatively analyzing each component obtained by dissolving an analyte in a liquid or supercritical fluid and separating analyte components through a column. Examples of the quantitative analyzer include a UV absorbance detector or a differential refractometer. The UV absorbance detector or differential refractometer, for instance, has a built-in flow cell, and the flow cell is irradiated with UV light while fluid with dissolved analyte components is made to flow so as to detect a difference in UV absorbance or refractive index. Because the measurement is performed while fluid is made to pass through a very thin pipe, a high liquid feeding pressure is applied by a liquid feeding pump. In addition, in supercritical fluid chromatograph, a high pressure is required to make carbon dioxide or the like a supercritical fluid. This necessitates a high sealing force (e.g., compressive force) at a connection part of the flow cell because a high pressure is also applied to the connection part.

Patent literature 1 presents an invention of using a metal seal material for a flow cell used in a detector for liquid chromatograph. Further, Patent Literature 2 presents an invention of providing a metal layer between a resin seal material and a resin seal material.

Patent Literature 3 discloses a gasket that is for a fuel injector of an internal combustion engine and is used under high temperature and high surface pressure, and presents a gasket in which voids of a metal non-woven fabric are filled with rubber.

CITATION LIST

Patent Literature

Patent Literature 1: JP 2016-180728 A
Patent Literature 2: JP 2014-55784 A
Patent Literature 3: JP 2006-71015 A

SUMMARY OF INVENTION

Technical Problem

Unfortunately, the metal seal material disclosed in Patent Literature 1 may cause corrosion of the material or contamination of metal components. In the combination of the resin seal material and the metal layer disclosed in Patent Literature 2, the resin seal is deformed or damaged due to the contamination of metal components or high sealing force. This has caused a risk of fluid leakage. In addition, the gasket disclosed in Patent Literature 3 is a metal non-woven fabric filled with rubber. This causes the rigidity to be higher than that of conventional rubber seal materials. However, since the metal content is exposed, there is a risk of contamination of metal components. Further, by using rubber with low rigidity, the rubber was deformed or damaged, leading to a risk of fluid leakage. Since the seal material of Patent Literature 3 also needs to exert a braking action, it is necessary to use rubber. Consequently, there has been a limitation of increasing the rigidity of the seal material.

In addition, flow cells, detectors, and analyzers using these seal materials may have low analysis accuracy. Further, because the seal materials are easily damaged, the replacement frequency is high. Also, there has been a risk of long device downtime, etc.

The present invention has been made in view of the above circumstances. The purpose of the invention is to provide a seal material having high rigidity without deformation or breakage, excellent corrosion resistance to fluid, and low solubility when used under high sealing force. In addition, use of the seal material of the invention makes it possible to provide a flow cell, a detector, and an analyzer in which there is no fluid leakage, contamination of the seal material components is prevented, and the replacement frequency is low.

Solution to Problem

The present inventors have conducted intensive research on the above problems and have discovered that if a fiber sheet is embedded in a resin, it is possible to obtain a seal material having high rigidity without too much deformation or breakage even in a high sealing force-applied environment, excellent corrosion resistance to fluid, and low solubility. Then, the invention has been completed.

Specifically,
The invention (1) is
a seal material for an analyzer, including a resin and at least one layer of fiber sheet embedded in the resin,
wherein the at least one layer of fiber sheet is embedded between and in substantially parallel to two seal surfaces: a first seal surface, which is one resin surface of the seal material; and a second seal surface, which is the other resin surface substantially parallel to the former one.

The invention (2) is
the seal material for an analyzer according to the invention (1), wherein the fiber sheet is a non-woven fabric.

The invention (3) of the invention is
the seal material for an analyzer according to the invention (1) or (2), wherein a ratio of a total surface area of fibers constituting the fiber sheet to a volume of the resin is from 40 $cm^2/cm^3$ to 500 $cm^2/cm^3$.

The invention (4) of the invention is
the seal material for an analyzer according to any one of the inventions (1) to (3), wherein the resin has a glass transition temperature of 40° C. or higher.

The invention (5) of the invention is
the seal material for an analyzer according to any one of the inventions (1) to (4), wherein the resin includes a thermoplastic resin.

The invention (6) of the invention is
the seal material for an analyzer according to the invention (5), wherein the thermoplastic resin includes a fluororesin.

The invention (7) of the invention is
the seal material for an analyzer according to the invention (6), wherein the thermoplastic resin includes tetrafluoroethylene or a perfluoroalkyl vinyl ether copolymer.

The invention (8) of the invention is
the seal material for an analyzer according to any one of the inventions (1) to (7), wherein the fiber sheet substantially parallel to the seal surfaces includes at least one kind of a metal fiber, an inorganic fiber, or an organic fiber.

The invention (9) of the invention is
a flow cell including at least one of the seal material for an analyzer according to any one of the inventions (1) to (8).

The invention (10) of the invention is
a detector including the flow cell of the invention (9).

The invention (11) of the invention is
an analyzer including at least one of the seal material for an analyzer according to any one of the inventions (1) to (8).

The invention (12) of the invention is
the analyzer according to the invention (11), wherein the analyzer is a liquid chromatograph or a supercritical fluid chromatograph.

Advantageous Effects of Invention

The invention makes it possible to provide a seal material having high rigidity without too much deformation or easy breakage, excellent corrosion resistance to fluid, and low solubility when used under high sealing force.

DESCRIPTION OF EMBODIMENTS

1. Structure of Seal Material

Figure 1:
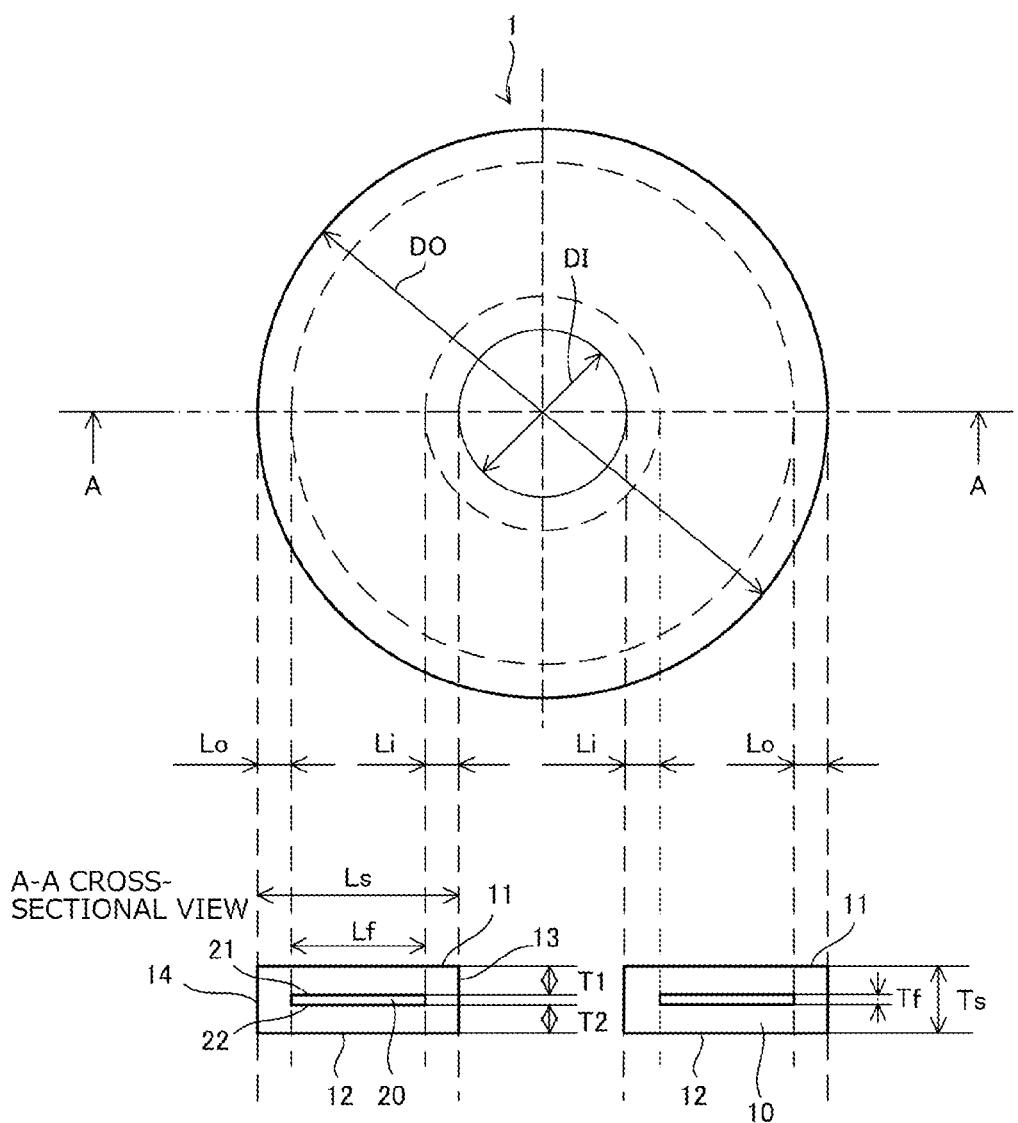
FIG. 1 is a schematic view showing a cross section of a seal material of the invention.

A seal material according to the invention includes a resin and a fiber sheet embedded in the resin. The seal material is characterized in that at least one layer of the fiber sheet is embedded in substantially parallel to two substantially parallel resin surfaces (where any one plane is a first seal surface and the other is a second seal surface), which are seal surfaces of the seal material.

Here, the term "substantially parallel" not only means that they are completely parallel, but also means that they are approximately parallel, that is, means that the case where a surface of the fiber sheet and each seal surface have an inclination of 10 degrees is included. Further, in this case, it is possible to neglect the presence or absence of unevenness existing on the fiber sheet surface and each seal surface of the resin portion and the inclination of the unevenness. The plane direction where the fiber sheet surface extends may be substantially parallel to the plane direction where each seal surface extends.

Further, in the case of the fiber sheet with warpage, if the flatness is ½ or less of the thickness of a seal material according to the invention and geometrically correct planes of a flat fiber sheet body are substantially parallel, the case is considered to be "substantially parallel". Note that the flatness conforms to JIS B0621-1984 "Definition and Expression of Geometric Deviation".

The shape, size, and thickness of the seal material are not particularly limited and may be selected in accordance with the shape and application of a member(s) to be sealed, and at least part thereof may include, as seal surfaces, two substantially parallel planes (where any one of the planes is a first seal surface and the other is a second seal surface). For instance, a plate-shaped member shaped like a disk, an elliptical plate, or a polygon is possible. The plate-shaped member may have a through-hole for passing fluid through a portion of its plane or a through-hole through which a fastener such as a bolt is secured. In addition, it is possible to have irregularities such as grooves that fit for the shape of a contact part of the member to be sealed.

Further, as used herein, the wording "including two substantially parallel planes" means that two planes where seal surfaces are formed (the first seal surface and the second seal surface) are substantially parallel before or when the seal material is used. Thus, the first and second seal surfaces and the fiber sheet may have a substantially parallel relationship during use.

The quantity, shape, size, and thickness of the fiber sheet included in the seal material are not particularly limited as long as the fiber sheet does not protrude through the seal surface of the seal material, and may be selected in accordance with the shape and application of the seal material. At least one layer of the fiber sheet should be embedded in substantially parallel to two substantially parallel resin surfaces (where any one plane is a first seal surface and the other is a second seal surface), which are seal surfaces of the seal material.

In addition, as stated above, the size, quantity, shape, size, and thickness of the fiber sheet are not particularly limited as long as the fiber sheet does not protrude through the seal surface of the seal material. When the seal material is used, a part protruding from the resin portion may be lost, resulting in a decrease in the strength of the resin portion. In the case of protrusion from an inner diameter-side lateral surface, in particular, a fluid flow path may be blocked and/or a part of the fiber sheet may be mixed in fluid. Thus, it is preferable that the fiber sheet is completely encapsulated. However, due to the convenience of the manufacturing process, a part (a very small part) of the fiber sheet may be exposed from the periphery of the resin portion. Accordingly, the term "embedded" herein is not limited to the meaning of "completely embedded" and includes the case where a part of the fiber sheet is exposed from the periphery of the resin portion.

Note that the number of fiber sheets included in the seal material may be one or more, and two or more fiber sheets may be bonded together. Further, a plurality of fiber sheets may be arranged in the thickness direction of the seal material. However, in view of the accuracy of arrangement of fiber sheets in the seal material, a preferable fiber sheet aspect is that one or two or more fiber sheets are bonded.

FIG. 1 shows an example of a seal material according to the invention, and illustrates, in detail, a structure according to the invention of the present application. The seal material shown in FIG. 1 is merely an example of the seal material of the invention, and the invention is thus not limited thereto.

FIG. 1 shows a donut-shaped (outer diameter DO, inner diameter DI, thickness Ts) seal material 1 (a resin portion 10 and the outer shape are the same) in which the center portion has a through-hole, for instance, through which a fluid passes or into which a round part fits. A fiber sheet 20 is encapsulated in the seal material 1 (resin portion 10). The resin portion 10 has an arbitrarily selected first seal surface 11 and a second seal surface 12. The fiber sheet 20 has a first fiber sheet surface 21 and a second fiber sheet surface 22. The first seal surface 11, the second seal surface 12, the first fiber sheet surface 21, and the second fiber sheet surface 22 are substantially parallel to one another.

As described above, the size of the seal material 1, that is, the sizes of the outer diameter DO and the inner diameter DI are not particularly limited, and it is possible to seal a member(s) to be sealed. For instance, the size may be large enough for fluid to flow or large enough to fit a round part. For instance, the seal material used for a flow cell in an analyzer may have an outer diameter DO of 2 mm to 20 mm and an inner diameter DI of 0.3 mm to 10 mm.

The thickness Ts of the seal material 1 is not particularly limited, and may be selected so as to have a sufficient crush margin by referring to, for instance, sealing force applied to a sealing portion and the Young's modulus of the resin of the seal material 1. For instance, the seal material used for a flow cell in an analyzer may have a thickness of 0.05 mm to 2 mm.

Figure 2:
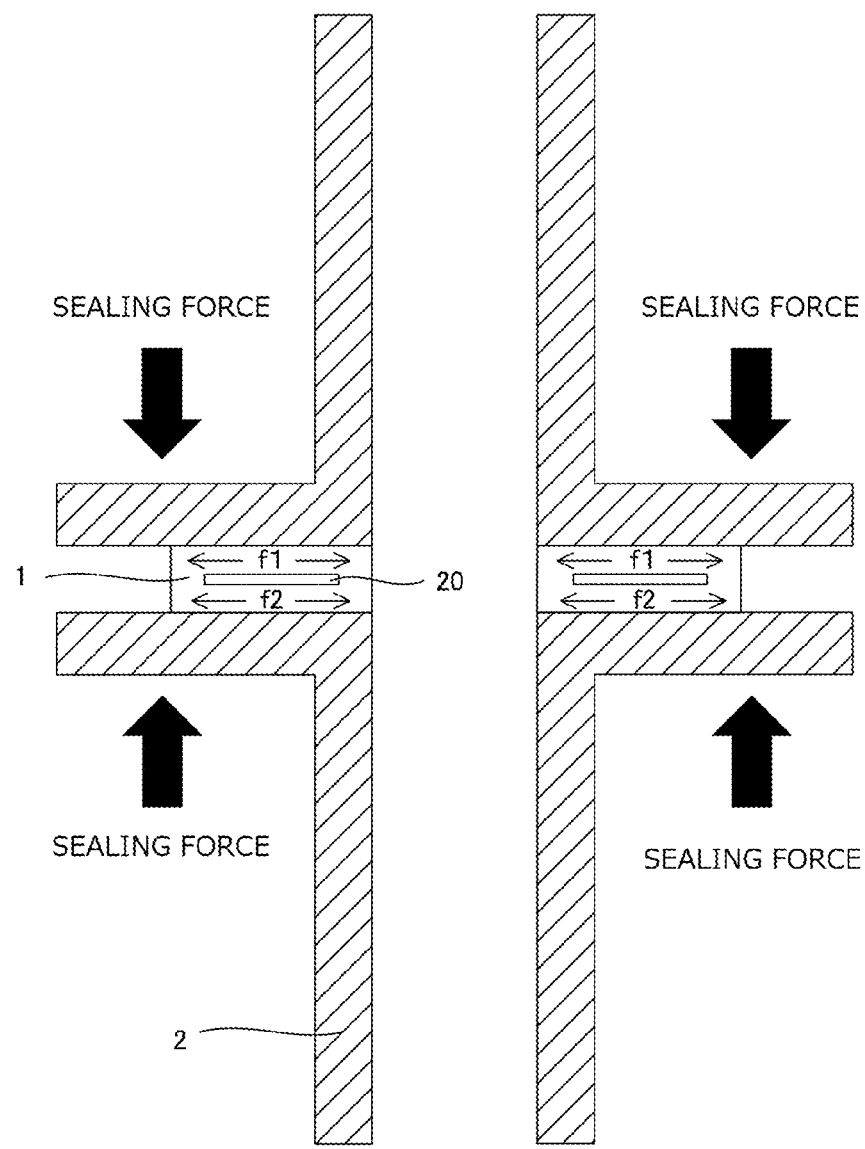
FIG. 2 is an explanatory diagram illustrating a stress state inside a seal material of the invention when a sealing force is applied to the seal material.

As shown in FIG. 2, the "crush margin" herein means the amount of deformation in the compression direction (in this example, the normal direction on the two seal surfaces of the seal material 1), which amount is required, when a sealing force is applied to the seal material 1, to tightly attach to and conform to the shape of the seal surface of a material to be sealed while the seal material is elastically deformed and/or plastically deformed.

In addition, as shown in FIG. 2, when the resin portion 10 of the seal material 1 is compressed by the sealing force, shear forces f1 and f2 are generated on the surfaces 21 and 22 of the fiber sheet 20. Although the details are unknown, it can be speculated that the effect of the invention is exerted because of the surface resistance of each fiber constituting the fiber sheet 20 to the shear forces f1 and f2. That is, the fiber sheet 20 is presumed to have an effect of suppressing the resin from being deformed more than necessary due to the sealing force.

In addition, the distance (resin thickness) T1 between the first surface 21 of the fiber sheet 20 and the first seal surface 11 of the resin portion 10 and the distance (thickness) T2 between the second surface 12 of the fiber sheet and the second seal surface 22 of the resin portion (resin thickness) may be the same or different, and are not particularly limited.

In addition, the ratio of the thickness Tf of the fiber sheet to the distance (resin thickness) T1 between the first surface 21 of the fiber sheet 20 and the first seal surface 11 of the resin portion 10 or the distance (thickness) T2 between the second surface 12 of the fiber sheet and the second seal surface 22 of the resin portion (resin thickness) is not particularly limited. Then, Tf/T1 and Tf/T2 are, each independently, preferably from 0.5 to 5 and more preferably from 1 to 3.

Here, as described above, when the resin portion 10 of the seal material 1 is compressed by a sealing force, shear forces f1 and f2 are generated on the surfaces 21 and 22 of the fiber sheet 20. At that time, if there is a difference between T1 and T2, the amount of deformation differs between the resin with T1 and the resin with T2, resulting in a difference between f1 and f2. In such a case, a stress gradient should be present from one surface (21 or 22) of the fiber sheet 20 to the other surface (22 or 21). As a result, a tensile force along the plane direction (f1 or f2, whichever larger) acts on one surface of the fiber sheet. However, the force acting on the other surface (f1 or f2, whichever smaller) is relatively weak. This plane of the fiber sheet receives a force in the compression direction along the plane direction. In general, fibers are strong against tensile force and weak against compressive force. The fiber sheet surface onto which the compressive force is applied is likely to cause deformation or breakage. Thus, the fiber sheet may be deformed or damaged. This may also cause the seal material 1 to be deformed or damaged. Hence, it is preferable that T1 and T2 are substantially the same. As used herein, the term "substantially the same" includes the case where they are not completely the same, and the difference between T1 and T2 may be 10% or less of T1 or T2.

The length Lf of the fiber sheet in the seal material 1 of FIG. 1 is shorter than the length Ls of the seal material 1 (seal surface), and the fiber sheet 20 is completely encapsulated in the resin portion 10. However, the invention is not limited to this embodiment. That is, the case where Lf is longer than Ls is also included. A part of the fiber sheet 20 may protrude from the resin portion on the outer diameter side or the inner diameter side of the seal material 1 in FIG. 1. When the seal material is used, however, a part protruding from the resin portion may be lost, resulting in a decrease in the strength of the resin portion 10. Also, the part, in particular, may stick out from the inner diameter-side lateral surface. In these cases, a fluid flow path may be blocked and/or a part of the fiber sheet may be mixed in fluid. Thus, it is preferable that the fiber sheet is completely encapsulated (the case of Ls>Lf is preferable).

Meanwhile, the Lf/Ls is preferably from 0.1 to 0.9, more preferably from 0.3 to 0.7, and still more preferably from 0.4 to 0.6. When Lf/Ls is in such a range, the seal material is likely to have sufficient rigidity and easily retain a deformation margin. The deformation margin means the resin thickness (Li) from the fiber sheet 20 of FIG. 1 up to the inner diameter-side surface 13 of the resin portion or the resin thickness (Lo) from the fiber sheet 20 up to the outer diameter-side surface 14 of the resin portion. If Li or Lo is insufficient, the resin portion cannot be subject to suitable deformation. Thus, the sealing property may not be ensured.

Further, the positional relationship between Lf and Ls is not particularly limited. However, it is preferable that the fiber sheet is not deviated on the inner diameter side or the outer diameter side of the seal material, and is evenly arranged with respect to the length (Ls) of the seal surface onto which compressive force is applied. In the case of FIG. 1, it is preferable that the midpoint of Ls and the midpoint of Lf coincide with each other in a direction parallel to the plane direction of the seal surface or the fiber sheet surface. That is, the case of Li=Lo is preferable.

As described above, in the seal material of the invention of the present application, the effect of the fiber sheet to prevent deformation of the resin portion and the presence of a crush margin to ensure the sealing property are important. That is, the ratio of the total surface area of fibers constituting the fiber sheet to the volume of the resin included in the seal material is critical. The ratio of the total surface area of fibers constituting the fiber sheet to the volume of the resin included in the seal material is not particularly limited, and may be, for instance, from 30 cm$^2$/cm$^3$ to 500 cm$^2$/cm$^3$, preferably from 40 cm$^2$/cm$^3$ to 500 cm$^2$/cm$^3$, and more preferably from 50 cm$^2$/cm$^3$ to 300 cm$^2$/cm$^3$. If the ratio is within such a range, the resin portion of the seal material has a crush margin that can conform to the shape of a sealing portion of a member to be sealed, and the fiber sheet gives resistance that hinders the deformation of the resin portion. This does not cause too much deformation. Hence, even when a high sealing force is applied, the resin is neither excessively deformed nor damaged, so that fluid leakage or the like does not occur.

Here, a procedure for measuring the volume of the resin is not particularly limited, and a known procedure can be used. For instance, the resin volume may be obtained as the difference between the volume of the seal material, as calculated from the outer shape of the seal material, and the volume of the fiber sheet, as calculated from the outer shape of the fiber sheet included inside.

Here, the total surface area of fibers is the total surface area of all the fibers constituting the fiber sheet. How to calculate the total surface area of fibers is not particularly limited, and a known procedure can be used. For instance, the total surface area of fibers can be calculated as follows. Note that the following details the case where the fibers constituting the fiber sheet are made of single material.

First, the average surface area (Sf) per fiber included in the fiber sheet is obtained. The average surface area (Sf) is calculated for 20 randomly selected fibers. An observation device such as a scanning electron microscope is used to measure the surface areas (S1 and S2) of both end faces of the above fibers, the lengths (L1 and L2) of the circumference of the two end faces of the fibers, and the length (L3) of each fiber. Then, the surface area of one fiber calculated using the following formula is estimated for the 20 fibers selected, and the resulting number average is set to the average surface area.

Surface area ($Sf$) of one fiber=$\{S1+S2+(L1+L2)/2 \times L3\}$

Second, the average volume (Vf) per fiber included in the fiber sheet is calculated. The average volume is calculated for 20 randomly selected fibers. An observation device such as a scanning electron microscope is used to measure the diameters (D1 and D2) of both end faces of these fibers and the length (L3) of each fiber. Then, the volume of one fiber calculated using the following formula is estimated for the 20 fibers selected, and the resulting number average is set to the average volume.

Volume ($Vf$) of one fiber=$\{(D1+D2)/2/2\}^2 \times \pi \times L3$

Third, the average mass (MO per fiber included in the fiber sheet is calculated. The mass is calculated, using the following formula, from Vf and the density (DO of the fiber material. The density of the fiber material is calculated using the density of material constituting the fiber. For instance, in the case of SUS316L (specified in JIS G3214, etc.), 7.98 g/cm$^3$ is used.

Average mass per fiber ($Mf$)=$Vf \times Df$

Fourth, the total number (Nf) of fibers included in the fiber sheet is calculated. The total number is calculated, using the following formula, from the mass (Ms) of the fiber sheet and Mf The mass (Ms) of the fiber sheet can be measured by a known procedure using, for instance, a balance.

The total number of fibers ($Nf$)=$Ms/Mf$

Finally, the total surface area of fibers is calculated by the following formula.

Total surface area of fibers=$Nf \times Sf$

Note that if the fiber sheet contains fibers made of a plurality of materials (hereinafter, referred to as each material) in a mixed manner, substantially the same as above can be applied while the following (A) to (E) are used for the calculation. The fibers made of a plurality of materials include not only fibers having different materials but also fibers having the same material but different sizes and densities.

(A) Determine Sf, Vf, and Mf for each material.
(B) Multiply Ms by the compounding ratio of each material to obtain the total mass of each material included in the fiber sheet.
(C) Divide the total mass of each material by Mf of each material to determine Nf of each material. (D) Multiply Nf of each material by Sf of each material to calculate the total surface area of each material.
(E) Set the sum of the total surface areas of all the respective materials to the total surface area of fibers.

Note that the compounding ratio of each material may be determined by a known procedure such as composition analysis.

The density of the fiber sheet in the invention is not particularly limited, and may be, for instance, from 0.5 g/cm$^3$ to 5.5 g/cm$^3$, preferably from 1.0 g/cm$^3$ to 5.0 g/cm$^3$, and more preferably from 1.5 g/cm$^3$ to 4.0 g/cm$^3$.

1-1. Resin

The material of the resin in the invention is not particularly limited, and may be selected in accordance with usage such as the type of fluid flowing through an analyzer in the present application (e.g., solubility resistance), temperature, or sealing force applied to the seal material. Examples of the resin include a thermoplastic resin, a thermosetting resin, an energy beam-curable resin, rubber, an elastomer, or the like.

Also, the resin can further include, in addition to the fiber sheet, additives such as a filler and a plasticizer.

The material of the resin may be selected in accordance with a sealing force applied to the seal material and the temperature of liquid or the like used. For instance, the glass transition temperature may be 40° C. or higher, preferably 80° C. or higher, and more preferably 100° C. or higher. The upper limit of the glass transition temperature is preferably high and examples include, but are not particularly limited to, 300° C. or less. If the glass transition temperature of the resin is within such a range, the seal material used for an analyzer has an appropriate hardness, neither deforms nor breaks too much, and causes no liquid leakage. In addition, an increase in the glass transition temperature can cause an appropriate hardness in the case of use at a high temperature.

Here, the glass transition temperature can be measured by using a known measuring procedure, for instance, by a procedure based on JIS K7121-1987 "Testing methods for transition temperatures of plastics".

The resin material may also be selected in accordance with Young's modulus at the temperature at which the material is used. The Young's modulus of the resin may be, for instance, 50 MPa or more, preferably 100 MPa or more, and more preferably 150 MPa or more at the temperature at which the sheet is used. The upper limit can be 3500 MPa or less. If the Young's modulus of the resin is within such a range, sufficient deformation is possible when a sealing force is applied. The resulting form can conform to the shape of the seal surface. Thus, the resin is neither excessively deformed nor damaged and causes no liquid leakage.

A known procedure may be used for a Young's modulus measuring procedure. For instance, the Young's modulus can be measured using a procedure according to JIS K7161-1994 "Plastic-Determination of tensile properties".

The case of including, into the resin portion of the seal material, additives such as a filler and a plasticizer involves the glass transition temperature and Young's modulus of the resin containing those additives. Hence, even if the resin alone has a low glass transition temperature and Young's modulus, the glass transition temperature and Young's modulus can be adjusted by adding a filler, an additive, or the like.

Examples of the thermoplastic resin include acrylonitrile butadiene styrene (ABS) resin; styrene-based resin such as polystyrene or syndiotactic polystyrene; polyamide-based resin such as nylon; polyester-based resin such as polyethylene terephthalate (PET) or polybutylene terephthalate (PBT); ultrahigh-molecular-weight polyethylene; modified polyphenylene ether; acrylic resin; polycarbonate (PC); polyimide (PI); polybenzimidazole (PBI); a liquid crystal polymer; polyphenylene sulfide (PPS); polyetheretherketone (PEEK); fluororesin such as tetrafluoroethylene (PTFE) or a perfluoroalkyl vinyl ether copolymer (PFA); or the like. They may be used singly or two or more kinds thereof may be used in combination. Note that the liquid crystal polymer is preferably a thermotropic liquid crystal polymer, and specific examples thereof include a polycarbonate-based liquid crystal polymer, a polyurethane-based liquid crystal polymer, a polyamide-based liquid crystal polymer, or a polyester-based liquid crystal polymer.

Examples of the thermosetting resin include epoxy resin, unsaturated polyester resin, polyvinyl ester resin, phenol resin, polyurethane resin, acrylic resin, melanin resin, melamine resin, urea resin, benzoguanamine resin, rosin-modified maleic acid resin, or rosin-modified fumaric acid resin, for example. They may be used singly or two or more kinds thereof may be used in combination.

Examples of the energy beam-curable resin include epoxy resin, acrylic resin, silicone-based resin, or polyester-based resin, for example. They may be used singly or two or more kinds thereof may be used in combination.

Examples of the rubber or elastomer include nitrile rubber, hydride nitrile rubber, fluorine rubber, silicone rubber, ethylene propylene rubber, chloroprene rubber, acryl rubber, butyl rubber, urethane rubber, natural rubber, chlorosulphonated polyethylene rubber, epichlorohydrin rubber, or an olefin-based elastomer, styrene-based elastomer, vinyl chloride-based elastomer, urethane-based elastomer, ester-based elastomer, or amide-based elastomer, for example. They may be used singly or two or more kinds thereof may be used in combination.

Of these resins, thermoplastic resins are preferable because of their ease of manufacture. Each fluororesin or PEEK, which is a resin having high conformity to the seal surface as a seal material and also having excellent corrosion resistance to fluid and low solubility, is more preferable. Tetrafluoroethylene (PTFE) or a perfluoroalkyl vinyl ether copolymer (PFA), in which a photodegradation reaction by UV light does not occur, is still more preferable.

Any additives can be added to the resin as long as the effects of the invention are not impaired. Examples of the additives include tackifiers, filling materials (inorganic fillers, organic fillers), plasticizers, fibers, flexibility control agents, anti-aging agents, silane coupling agents, physical property modifiers that modify the tensile properties of cured product produced, photocurable resins, sagging inhibitors, solvents, flame retardant imparting agents, lubricants, pigments, spacer shape preserving agents, flow improving agents, cross-linkers, and/or polymerization initiators, for example. In addition, various additives may be optionally added.

1-2. Fiber Sheet

The fiber sheet in the invention is not particularly limited as long as fibers are assembled to produce a sheet, and examples include a woven fabric (e.g., a twill weave, double weave, triple weave, tatami weave) or a non-woven fabric (including a paper shaped by papermaking), for example. It is preferable to use a fiber sheet having isotropic mechanical properties in the sheet plane directions of the fiber sheet. That is, the fiber sheet has no anisotropy in its plane directions and has isotropically strong mechanical properties in any plane direction. For instance, in the case of a plain woven fabric made of simple fibers orthogonal to 90 degrees, the mechanical properties in the direction in which the fibers are woven (the direction in which the fibers are extended) are excellent. However, the mechanical properties in a direction between the orthogonal fibers (for example, the 45-degree direction when the extending direction of one fiber is set to 0 degrees) are low. Further, when the seal material according to the invention is sealed, a high sealing force is applied to the fiber sheet. Accordingly, the shear force is isotropically applied to the fiber sheet in a direction(s) parallel to the surface of the fiber sheet (FIG. 2). At this time, although deformation is unlikely to occur in the fiber extending direction, deformation may readily occur in the 45-degree direction. The seal material may then be side-deformed, damaged, or leaked. Meanwhile, the case of a fiber sheet, such as a non-woven fabric, having isotropic mechanical properties in the plane directions of the sheet surface is characterized in that there is no anisotropy in the plane directions; accordingly, shear force is applied isotropically, so that the fiber sheet is unlikely to be deformed in any direction. Thus, a non-woven fabric can be preferably used as a fiber sheet in the invention.

The shape of the fiber sheet is not particularly limited and may be selected depending on the shape, size, thickness, and the like of the seal material. Generally speaking, examples include a plate-shaped member shaped like a disk, an elliptical plate, a polygon, or the like. The fiber sheet may have a through-hole for passing fluid through a portion of its plane or a through-hole through which a fastener such as a bolt is secured.

The thickness of the fiber sheet in the invention is not particularly limited and may be selected depending on the shape of the seal material. If the thickness of the fiber sheet is too thin, the mechanical properties such as the strength and elastic modulus of the fiber sheet may be lowered. Thus, the thickness of the fiber sheet in the invention is, for instance, preferably from 20 μm to 500 μm and more preferably from 30 μm to 200 μm.

1-2-1. Fiber

The fibers used to form the fiber sheet in the invention are not particularly limited, and known ones can be used. At least one of a metal fiber, an inorganic fiber, or an organic fiber may be included. Examples of each fiber include a metal fiber such as stainless steel fiber, nickel fiber, copper fiber, aluminum fiber, silver fiber, gold fiber, or titanium fiber; an organic fiber such as polyparaphenylene benzoxazole, polyolefin resin (e.g., polyethylene, polypropylene), polyethylene terephthalate (PET) resin, polyvinyl alcohol (PVA), polyvinyl chloride resin, aramid resin, acryl resin, polyimide resin, polyparaphenylene benzoxazole (PBO) fiber, cellulose, vinylon, nylon, rayon, aramid, phenolic fiber, fluorine fiber, pulp (fiber), kenaf, hemp, or bamboo fiber; or an inorganic fiber such as glass fiber, carbon fiber, silica fiber, rock wool, slag wool, alumina fiber, or ceramic fiber, for example. One or more of them can be used in combination. The fiber in the invention is preferably a fiber having a Young's modulus higher than the Young's modulus of the resin used for the seal material, and more preferably a metal fiber or an inorganic fiber. It is possible that the higher the Young's modulus of the fiber, the higher the rigidity of the fiber sheet. When the fiber is embedded in the resin, the rigidity of the resin can be effectively improved. This makes it possible to obtain a seal material that has high rigidity and is not easily damaged.

The fibers constituting the fiber sheet can be obtained by bonding the fibers to one another. When the fiber sheet contains an organic fiber, the fibers can be bound by fusion. When the fiber sheet contains a metal fiber or inorganic fiber, the fiber sheet can be heated and sintered in order to increase the bonding strength between the fibers. A known procedure may be used as the sintering process, which varies depending on the material of the fibers. In the case of singly using stainless steel fiber (e.g., stainless steel such as SUS304 or SUS316L), for instance, a reduction sintering furnace with a hydrogen gas atmosphere may be used under sintering conditions at a heat treatment temperature of 1120° C. and a rate of 15 cm/min.

The rigidity of the fiber sheet can be improved by fusion or sintering.

In addition, if the fiber sheet contains any organic fiber, the fiber sheet can be firmly formed because their fibrillation and softening by heating can contribute to bonding and entanglement between the fibers. If any inorganic fiber is included, the rigidity and strength of the fiber sheet can be enhanced.

The fiber diameter of each fiber used for the fiber sheet in the invention is not particularly limited, and may be, for instance, from 1 μm to 50 μm, preferably from 2 μm to 30 μm, more preferably from 3 μm to 20 μm, and particularly preferably from 4 μm to 8 μm.

The fiber length of each fiber used for the fiber sheet in the invention is not particularly limited as long as it does not interfere with manufacture, and may be, for instance, from 0.1 mm to 5 mm, preferably from 0.5 mm to 3 mm, and more preferably from 1 mm to 2 mm.

The porosity of the fiber sheet is not particularly limited, and may be, for instance, from 30% to 90%, more preferably from 40% to 85%, and still more preferably from 50% to 80%. If the porosity is within such a range, a highly rigid fiber sheet can be formed. This makes it possible to produce a seal material that has high rigidity and is not easily damaged. Further, the resin that has spread throughout the fiber sheet is tightly attached to the fiber surfaces constituting the fiber sheet. This is likely to cause a high sealing effect.

The porosity is the proportion of a space without any fibers with respect to the volume of the fiber sheet, and is calculated from the volume and mass of the fiber sheet and the density of each fiber material.

$$\text{Porosity (\%)}=(1-\text{Mass of fiber sheet}/(\text{Volume of fiber sheet}\times\text{Density of fiber}))\times 100$$

Note that the porosity can be adjusted by adjusting the thickness and amount of the fibers used, the density of the fiber-entangled material, and the pressure during compression molding.

In addition, if the fiber sheet is embedded in the resin, the porosity may be calculated from the outer dimensions of the fiber sheet and the fiber diameter and the fiber length of each fiber constituting the fiber sheet. The fiber diameter can be a diameter equivalent to that of a circle of the projected area.

1-2-2. Process for Producing Fiber Sheet

A known process may be used as a process for producing a fiber sheet in the invention. Examples of a process for producing a non-woven fabric, which is a preferable example, include: a fleece-forming process such as a dry process (e.g., carding, an airlaid process), wet papermaking (e.g., a papermaking-like forming process), spun bonding, or melt blowing; or a fleece-bonding process such as thermal bonding, chemical bonding, needle punching, spun lacing (water flow entanglement), stitch bonding, or a steam jet process, for example. Of these, the production process by wet papermaking is suitable because the fiber sheet can be made thinner and excels in terms of uniformity.

The following describes a step of forming a fiber sheet by wet papermaking, which is a preferable example in the invention.

As a process for producing a fiber sheet in the invention, for instance, a known papermaking process may be used for production. For instance, one or more fibers and optionally other component(s) may be dispersed into water to prepare a raw material slurry. The resulting raw material slurry may be subject to wet papermaking to produce a fiber sheet.

Cellulosic fibers and the like are preferably beaten in advance. The beating can be appropriately performed with a beating machine such as a single disc refiner (SDR), a double disc refiner (DDR), a beater, or the like.

The wet paper machine used for wet papermaking is not particularly limited, and may be a paper machine applied to general papermaking technology. Specifically, it is possible to use a long net paper machine, a circular net paper machine, an inclined paper machine, a twin wire paper machine, etc.

A desired porosity can be obtained by adjusting the press pressure during dehydration and drying steps in the papermaking step, the roll surface temperature during the drying step, or the like.

If the fiber sheet contains any organic fiber, the bonding between the fibers can be enhanced by adjusting the roll temperature during the drying step.

Further, in the case of including any metal fiber or inorganic fiber, a strong fiber sheet can be formed by further providing a sintering step. Known methods, devices, and conditions can be used for the sintering conditions and the device configuration, and are not particularly limited. For instance, in the case of forming a fiber sheet containing only stainless steel fiber, a vacuum sintering device may be used to perform sintering in a vacuum sintering furnace with a vacuum degree of 13.3 mPa under sintering conditions at a sintering temperature of 1120° C. for a retention time of 30 min.

Further, during the relevant steps, other additives can be added for the efficiency of producing the fiber sheet or for imparting a special function to the fiber sheet. For instance, if the bonding strength between the fibers is weak, an acryl resin or the like may be added as a binder.

2. Characteristics of Seal Material 2-1. Pressure Cycle Test

As described above, a seal material according to the invention is used for a connection part of an analyzer. Generally speaking, a strong load is applied to the seal material when a fluid starts to flow (at the time of plunge), and the load stabilizes when it settles in a steady state. Thus, as a characteristic of the seal material, durability is required during a cycle test in which a pressure load is turned on/off (during repeated plunge).

The cycle test can be carried out by connecting, with a seal material, to a stainless steel pipe (with an outer diameter of 3 mm) connected to a pump and by flowing water through the pipe. The pump is next actuated to flow water, thereby applying a back pressure to the inside of the pipe. The pipe is then left for 10 min. After 10 min, the pump is stopped to release the back pressure and the pipe is then left for 10 min. After that, the back pressure application and the back pressure release are repeated. This pressure cycle test can be evaluated by repeating the procedure a predetermined number of times and checking the presence or absence of water leakage and the degree of deformation of the seal material after the cycle test. The conditions below may be used. The presence or absence of water leakage and the degree of deformation of the seal material may be macroscopically observed.

Ambient temperature: 25±2° C.

Applied back pressure (pump discharge pressure): 30 MPa, 70 MPa, or 100 MPa

The number of cycles: 100 cycles

3. Method of Manufacturing Seal Material

The method of manufacturing a seal material in the invention is not particularly limited, and a known method can be used. For instance, in the case of using a thermoplastic resin as the resin, the seal material may be manufactured by a manufacturing method in which a fiber sheet is placed in a heated mold and a thermally melted thermoplastic resin is casted thereinto while pressurized by a press machine, and the whole is then cooled; or by heating and pressing materials while a pressure is adjusted, cooling them, and removing a protruding portion.

In addition, the case of using a thermosetting resin, a fiber sheet is placed in a heated mold and a thermally melted thermosetting resin is casted thereinto while pressurized by a press machine (while a curing catalyst is optionally added) like the case of the thermoplastic resin. The whole may be further heated to a curing temperature and may then be cooled to produce a seal material.

Note that in order to remove the residual stress (residual strain) of the seal material manufactured, residual stress (residual strain) removal treatment can be performed. The procedure for removing residual stress (residual strain) is not particularly limited, and for instance, a shot peening procedure, annealing treatment (heat treatment), or the like may be implemented. As the annealing treatment of the seal material used in an analyzer, annealing treatment is preferable in which the seal material is not mixed into an analyte and even a small-sized seal material can be uniformly treated.

The annealing treatment can be performed using a known method and conditions. Generally speaking, in the case of crystalline resin, the seal material may be heated to a temperature equal to or higher than the glass transition temperature of the resin, for instance, higher than the glass transition temperature and 10° C. to 30° C. higher than the temperature expected to be used, and may then be kept for 30 min to 24 h to conduct annealing treatment. In the case of amorphous resin, for instance, the seal material may be heated to a temperature 20° C. to 30° C. lower than the glass transition temperature or 5° C. to 10° C. lower than the deflection temperature under load, and may then be kept for 30 min to 24 h to conduct annealing treatment. For instance, in the case of a perfluoroalkyl vinyl ether copolymer, annealing treatment may be conducted under conditions at 220° C. for 16 h.

4. Seal Material Applications

The seal material according to the invention is not particularly limited as long as used as a seal material, and is suitably used for applications where a higher sealing force is applied. Such applications include seal materials for analyzers such as liquid chromatographs and supercritical fluid chromatographs that require high fluid pressure. Each seal material is used particularly in an analyzer such as a liquid chromatograph or a supercritical fluid chromatograph. In addition, the seal materials may be used for UV detectors or a lens part of differential refractometers in analyzers like liquid chromatographs or supercritical fluid chromatographs, mixers (with mixing and sealing functions), and/or a piping portion through which a fluid flows and where a high pressure is applied. In these devices/instruments, a high fluid pressure is required because the fluid flows through a narrow pipe at a constant flow rate. Further, in supercritical fluid chromatography, for instance, a high pressure is required to transform carbon dioxide or the like to a supercritical fluid. Thus, a high pressure is also applied to a piping portion of a flow cell and/or a connection part such as a lens, built in the above-mentioned UV absorbance detector or differential refractometer. Accordingly, a strong sealing force is required for the connection part or the like. This seal material of the invention of the present application is suitable as a seal material that can endure the sealing force.

EXAMPLES

Examples 1 to 3

<To Produce Fiber Sheet>

Stainless steel fibers (SUS316L) with a fiber length of 2.0 mm and a fiber diameter of 4 µm, 8 µm, or 22 µm and PET fibers required for sheet handling were dissociated and dispersed in appropriate amounts in water to prepare each slurry. The resulting slurry was dehydrated and pressed by a wet papermaking process and dried by heating to produce a metal fiber sheet. The produced sheet was heat-pressed using a heating roll having a surface temperature of 160° C. under conditions at a linear pressure of 300 kg/cm and a rate of 5 m/min. Next, without pressurizing the press-bonded metal fiber sheet, in a hydrogen gas atmosphere, using a continuous sintering furnace (brazing furnace with a mesh belt), sintering treatment was conducted at a heat treatment temperature of 1120° C. and a rate of 15 cm/min to sinter the stainless steel fibers. Three kinds of the metal fiber sintered sheet with different fiber diameters at a basis weight of 50 g/m$^2$ and a density of 1.69g/cm$^3$ were obtained. Table 1 shows the porosities of the resulting fiber sheets. Further, each fiber sheet was cut into the following shape.

Fiber sheet shape: Donut shape

Outer diameter: 5.0 mm

Inner diameter: 2.3mm

Fiber sheet thickness: 0.1 mm

Lf (FIG. 1): 2.7 mm

<Manufacturing Seal Material>

Each fiber sheet of Example 1 was sandwiched between sheets made of a perfluoroalkyl vinyl ether copolymer (PFA)

in a press machine heated to 400° C., pressurized while the pressure was adjusted, and then cooled. After that, an excess resin portion was removed by punching to obtain a seal material with the following dimensions according to the invention. By using each fiber sheet containing 4-nm, 8-μm, or 22-μm fibers, respective seal materials with an inner diameter of 1 mm were manufactured as the seal materials of Examples 1 to 3, respectively. Table 1 shows the seal materials manufactured.

Seal material shape: Donut shape
Outer diameter (DO): 6.0 mm
Inner diameter (DI): 1 mm
Thickness of seal material: 0.2 mm As Comparative Example 1, a seal material was manufactured in the same manner as in Examples 1 to 3 except that the fiber sheet was not included (resin only). Table 1 shows the seal materials manufactured.

Seal material shape: Donut shape
Outer diameter (DO): 6.0 mm
Inner diameter (DI): 1 mm
Thickness of seal material: 0.2 mm
Ls (FIG. 1): None
T1 (FIG. 1): None
T2 (FIG. 1): None
Li (FIG. 1): None
Lo (FIG. 1): None
Lf/Ls: None <Evaluation Procedure>
Pressure Cycle Test A flow cell using the seal material of each Example or Comparative Example was fastened to the liquid feeding side of a plunger pump (LC-30AD; manufactured by Shimadzu Corporation) in which the liquid feeding flow rate and back pressure were able to be monitored. An SUS316L resistance tube with an inner diameter of 0.1 mm was connected to the end part. A constant pressure can be applied to the flow cell by passing liquid (mobile phase) at a constant flow rate through this resistance tube.

When the temperature of the resistance tube changes, the viscosity of the fluid flowing through the resistance tube changes and the inner diameter of the resistance tube also changes, so that a constant pressure cannot be applied. Because of this, in this evaluation, the pressure applied to the flow cell was made constant by placing the resistance tube in a thermostatic chamber (CTO-20AC; manufactured by Shimadzu Corporation) and adjusting the temperature to 20° C.

Water was used as the mobile phase and the liquid feeding rate was varied such that any pressure from 10 MPa to 110 MPa was applied to the flow cell.

In the measurement, the back pressure of the plunger pump was 30 MPa, 70 MPa, or 100 MPa, and a 10-min back pressure-applied state and a 10-min atmospheric pressure state were set to one cycle and were repeated. For evaluation, 100 cycles were repeated to evaluate water leakage and deformability. Table 1 shows the results.

<Evaluation>
Water Leakage Evaluation

⊚: No water leakage at a back pressure of 100 MPa
○: No water leakage at a back pressure of 70 MPa, but there was water leakage at a back pressure of 100 MPa
Δ: No water leakage at a back pressure of 30 MPa, but there was water leakage at a back pressure of 70 MPa
×: There was water leakage at a back pressure of 30 MPa Deformability Evaluation (the presence or absence of flow at the time of occurrence of water leakage)

⊚: The seal material has a donut shape kept at a back pressure of 100 MPa.
○: No water leakage at a back pressure of 70 MPa, and the seal material has a donut shape kept at a back pressure of 100 MPa.
66: No water leakage at a back pressure of 30 MPa, and the seal material has a donut shape kept at a back pressure of 70 MPa.
×: The donut shape is broken at a back pressure of 30 MPa.

TABLE 1

| | Each portion of seal material | | | | | Fiber sheet | | Ratio of the total surface | Evaluations | |
|---|---|---|---|---|---|---|---|---|---|---|
| | DI | Li | Lo | Lf/Ls | Volume of resin portion | Fiber diameter | Total surface area of fiber sheet | area of constituting fibers to the volume of resin | Water leakage evaluation | Deformability deformation |
| Example 1 | 1 mm | 1.3 mm | 1 mm | 0.54 | 1.37 cm³ | 4 μm | 354 cm² | 258 | ⊚ | ⊚ |
| Example 2 | | | | | | 8 μm | 177 cm² | 129 | ⊚ | ⊚ |
| Example 3 | | | | | | 22 μm | 65 cm² | 47 | Δ | ⊚ |
| Comparative Example 1 | 1 mm | — | — | — | 1.37 cm³ | No fiber sheet | — | — | X | X |

<Evaluation Results>

From the results in Table 1, it can be understood that the seal material of the invention is an excellent seal material having high deformation resistance and no water leakage after the high pressure cycle test, and the effects of the invention are thus clear.

REFERENCE SIGNS LIST

1 Seal material
2 Piping member (Joint part)
10 Resin portion
11 First seal surface
12 Second seal surface
13 Inner diameter-side lateral surface
14 Outer diameter-side lateral surface
20 Fiber sheet
First fiber sheet surface
Second fiber sheet surface

The invention claimed is:
1. A seal material for an analyzer, comprising
a resin and at least one layer of fiber sheet embedded in the resin,
wherein the at least one layer of fiber sheet is embedded between and in substantially parallel to two seal surfaces: a first seal surface, which is one resin surface of the seal material; and a second seal surface, which is the other resin surface substantially parallel to the first seal surface,
wherein a thickness of the seal material is from 0.05 mm to 2 mm, wherein the fiber sheet consists only of fiber,
wherein a thickness of the fiber sheet is from 20 μm to 500 μm, and
wherein a ratio of a total surface area of fibers constituting the fiber sheet to a volume of the resin is from 50 cm$^2$/cm$^3$ to 500 cm$^2$/cm$^3$.

2. The seal material for an analyzer according to claim 1, wherein the fiber sheet is a non-woven fabric.

3. The seal material for an analyzer according to claim 1, wherein the resin has a glass transition temperature of 40° C. or higher.

4. The seal material for an analyzer according to claim 1, wherein the resin comprises a thermoplastic resin.

5. The seal material for an analyzer according to claim 4, wherein the thermoplastic resin comprises a fluororesin.

6. The seal material for an analyzer according to claim 5, wherein the fluororesin comprises tetrafluoroethylene or a perfluoroalkyl vinyl ether copolymer.

7. The seal material for an analyzer according to claim 1, wherein the fiber sheet substantially parallel to the seal surfaces comprises a metal fiber.

8. A flow cell comprising at least one of the seal material for an analyzer according to claim 1.

9. A detector comprising the flow cell of claim 8.

10. An analyzer comprising at least one of the seal material for an analyzer according to claim 1.

11. The analyzer according to claim 10, wherein the analyzer is a liquid chromatograph or a supercritical fluid chromatograph.

12. The seal material for an analyzer according to claim 1, wherein a ratio of a length Lf of the fiber sheet to a length Ls of the seal material (Lf/Ls) is from 0.1 to 0.9.

13. The seal material for an analyzer according to claim 1, wherein the fiber sheet substantially parallel to the seal surfaces comprises at least one kind of an inorganic fiber or an organic fiber.

14. The seal material for an analyzer according to claim 7, wherein the metal fiber comprises stainless steel fiber, nickel fiber, copper fiber, aluminum fiber, silver fiber, gold fiber, or titanium fiber.

15. The seal material for an analyzer according to claim 7, wherein the metal fiber is sintered.

* * * * *